US011937067B2

(12) United States Patent
Winton et al.

(10) Patent No.: US 11,937,067 B2
(45) **Date of Patent: *Mar. 19, 2024**

(54) SYSTEM AND METHOD FOR SOUND ZONE EXPERIENCE OPTIMIZATION CONTROL

(71) Applicant: Harman International Industries, Incorporated, Stamford, CT (US)

(72) Inventors: Riley Winton, Opelika, AL (US); Christopher Michael Trestain, Livonia, MI (US); Chris Ludwig, Bloomfield Hills, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,119

(22) Filed: Jun. 29, 2022

(65) Prior Publication Data

US 2022/0329963 A1 Oct. 13, 2022

Related U.S. Application Data

(63) Continuation of application No. 17/180,020, filed on Feb. 19, 2021, now Pat. No. 11,412,339.

(60) Provisional application No. 62/979,821, filed on Feb. 21, 2020.

(51) Int. Cl.
*H04S 7/00* (2006.01)

(52) U.S. Cl.
CPC .................................... *H04S 7/302* (2013.01)

(58) Field of Classification Search
CPC .. H04S 7/302; H04S 2400/09; H04S 2400/13; H04S 2420/07; H04R 2499/13
USPC .......................................................... 381/302
See application file for complete search history.

(56) References Cited

U.S. PATENT DOCUMENTS

2017/0213541 A1* 7/2017 MacNeille ....... G10K 11/17881
2018/0302734 A1 10/2018 Choi et al.

FOREIGN PATENT DOCUMENTS

EP 3486121 A1 5/2019
WO 2016008621 A1 1/2016

OTHER PUBLICATIONS

Extended European Search Report for EP Application No. 21158376.0, dated Jun. 22, 2021, 10 pgs.

(Continued)

*Primary Examiner* — Paul Kim
(74) *Attorney, Agent, or Firm* — Brooks Kushman P.C.

(57) ABSTRACT

An apparatus for providing a contrast mode and a front optimized mode for audio in a vehicle is provided. An audio controller is programmed to transmit first audio content in a first zone seating area and to transmit second audio content in a second zone seating area. The audio controller receives a first indication to transmit the first audio content in the first zone seating area and the second audio content in the second zone seating area in the contrast mode to provide an equal listening experience. The audio controller receives a second indication to transmit the first audio content in the first zone seating area and the second audio content in the second zone seating area in the front optimized mode to increase a quality of sound in the first zone seating area and to decrease a quality of sound in the second zone seating area.

18 Claims, 5 Drawing Sheets

*The example GUI element shows a horizontal slider that can be used to optimize the sound zones system for maximum sound quality or for maximum separation between zones. This example shows a continuous axis of control. Other embodiments may contain a simple binary toggle switch, a radio button group, or another type of mode select element.*

(56) References Cited

OTHER PUBLICATIONS

First Office Action dated Aug. 16, 2023 for European Application No. 21158376.0 filed Feb. 22, 2021, 7 pgs.

* cited by examiner

The example GUI element shows a horizontal slider that can be used to optimize the sound zones system for maximum sound quality or for maximum separation between zones. This example shows a continuous axis of control. Other embodiments may contain a simple binary toggle switch, a radio button group, or another type of mode select element.

SYSTEM AND METHOD FOR SOUND ZONE EXPERIENCE OPTIMIZATION CONTROL

CROSS-REFERENCE TO RELATED APPLICATIONS

This application is a continuation of U.S. application Ser. No. 17/180,020 filed Feb. 19, 2021, now U.S. Pat. No. 11,412,339, issued Aug. 9, 2022, which claims the benefit of U.S. provisional application Ser. No. 62/979,821 filed Feb. 21, 2020, the disclosures of which are hereby incorporated in their entirety by reference herein.

TECHNICAL FIELD

Aspects disclosed herein generally relate to a system and method for sound zone experience optimization control in a vehicle. These aspects and others will be discussed in more detail herein.

BACKGROUND

With a sound zone system in a vehicle, there may be a tradeoff between separation (or isolation) between individual sound zones and the overall subjective sound quality. In other words, a system can focus specifically on cancelling sounds from sounds from adjacent zones, but this may come with poor spatial performance, poor spectral performance, and a generally undesirable listening experience. On the other side, a system may attempt to provide users with the best possible listening experience by providing, for example, surround algorithms, headrest/immersion speakers, etc. However, these may leave all occupants with high levels of distracting sounds from other zones.

SUMMARY

In at least one embodiment, an apparatus for providing a contrast mode and a front optimized mode for the playback of audio in a vehicle is provided. The apparatus includes a memory and an audio controller. The audio controller includes the memory and is programmed to transmit first audio content as desired by one or more first vehicle occupants positioned in a first zone seating area and to transmit second audio content as desired by one or more second vehicle occupants positioned in a second zone seating area. The audio controller is further programmed to receive a first indication from the one or more first vehicle occupants to transmit at least one of the first audio content in the first zone seating area and the second audio content in the second zone seating area in the contrast mode to provide an equal listening experience for the first zone seating area and the second zone seating area while achieving isolation between the first audio content being played back in the first zone seating area and the second audio content being played back in the second zone seating area. The audio controller is further programmed to receive a second indication from the one or more first vehicle occupants to transmit at least one of the first audio content in the first zone seating area and the second audio content in the second zone seating area in the front optimized mode to increase a quality of sound of the first audio content being played back in the first zone seating area and to decrease a quality of sound in the second zone seating area.

In at least another embodiment, a computer-program product embodied in a non-transitory computer read-able medium that is programmed for providing a contrast mode and a front optimized mode for the playback of audio in a vehicle is provided. The computer-program product includes instructions for transmitting first audio content as desired by one or more first vehicle occupants positioned in a first zone seating area and for transmitting second audio content as desired by one or more second vehicle occupants positioned in a second zone seating area. The computer-program product includes instructions for receiving a first indication from the one or more first vehicle occupants to transmit at least one of the first audio content in the first zone seating area and the second audio content in the second zone seating area in the contrast mode to provide an equal listening experience for the first zone seating area and the second zone seating area while achieving isolation between the first audio content being played back in the first zone seating area and the second audio content being played back in the second zone seating area. The computer-program product further includes instructions for receiving a second indication from the one or more first vehicle occupants to transmit at least one of the first audio content in the first zone seating area and the second audio content in the second zone seating area in the front optimized mode to increase a quality of sound of the first audio content being played back in the first zone seating area and to decrease a quality of sound in the second zone seating area.

In at least another embodiment, a method for providing a contrast mode and a front optimized mode for the playback of audio in a vehicle is provided. The method includes transmitting first audio content as desired by one or more first vehicle occupants positioned in a first zone seating area and transmitting second audio content as desired by one or more second vehicle occupants positioned in a second zone seating area. The method further includes receiving a first indication from the one or more first vehicle occupants to transmit at least one of the first audio content in the first zone seating area and the second audio content in the second zone seating area in the contrast mode to provide an equal listening experience for the first zone seating area and the second zone seating area while achieving isolation between the first audio content being played back in the first zone seating area and the second audio content being played back in the second zone seating area. The method further includes receiving a second indication from the one or more first vehicle occupants to transmit at least one of the first audio content in the first zone seating area and the second audio content in the second zone seating area in the front optimized mode to increase a quality of sound of the first audio content being played back in the first zone seating area and to decrease a quality of sound in the second zone seating area.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
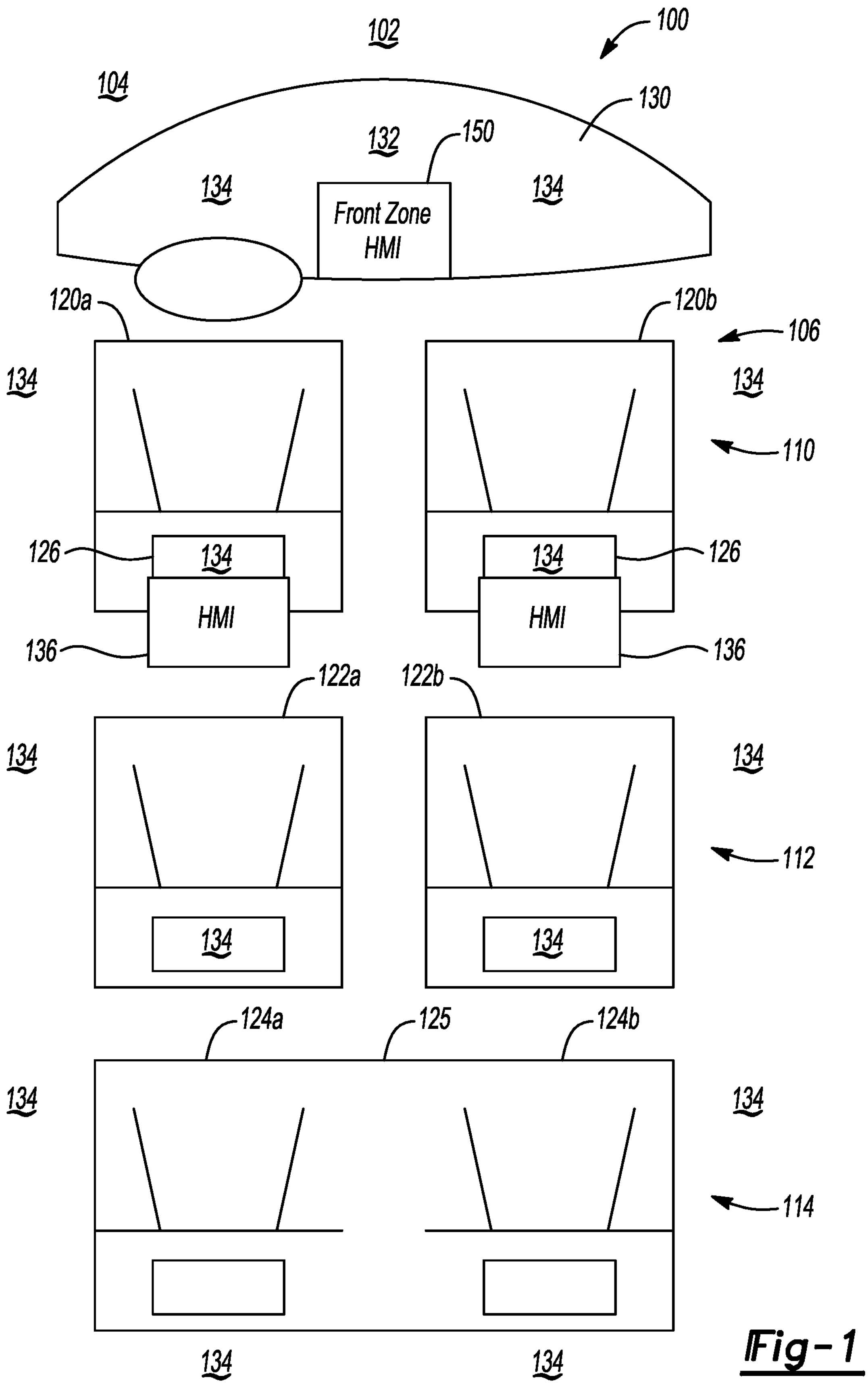
FIG. 1 depicts a system for providing sound zone experience optimization control in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that at least one controller as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, the at least one controller as disclosed herein utilize one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The disclosed controller(s) also include hardware-based inputs and outputs for receiving and transmitting data, respectively from and to other hardware-based devices as discussed herein.

With a sound zone system in a vehicle, there may be a tradeoff between separation (or isolation) between individual sound zones and the overall subjective sound quality. In other words, a system can focus specifically on cancelling sounds from adjacent zones, but this may come with poor spatial performance, poor spectral performance, and a generally undesirable listening experience. On the other side, a system may attempt to provide users with the best possible listening experience by providing, for example, surround algorithms, headrest/immersion speakers, etc. However, these may leave all occupants with high levels of distracting sounds from other zones.

Aspects disclosed herein generally provide for a system and method that may utilize a complex digital signal processing (DSP) matrix and a controller to optimize combined sound zone experiences in a vehicle according to a user's preference. In other words, users may elect to sacrifice sound quality for maximum separation between various sound zones in a vehicle. In addition, one or more users may focus on sound quality with a known compromise of reduced separation.

In a typical use case, one "master" sound zone occupant in the vehicle may have the ability to activate this control. A typical example may involve a family road trip. For example, parents positioned in a first seating zone (i.e., in a front row of the vehicle) may be listening to music and children may be positioned in one or more second and/or third seating zone watching a movie. If the parents want to enjoy a premium stereo or surround music experience up front, the parent may adjust the controller to maximize sound quality. This may inherently decrease the separation from front-to-back, meaning the children in the back may have to put up with increased distracting noises.

However, in a similar use case, parents may elect to have all sounds zones provide audio with generally equal sound quality and maximum separation. This may allow all occupants the best chance to hear their own content with a decent signal-to-noise ratio (SNR) and desired speech intelligibility. Such a control between a contrast mode (e.g., an audio system that provides an equal listening experience for both front and rear sound zones with an intent of achieving maximum contrast between the zones) and a front optimized mode (e.g., and audio zone that provides optimized, spatially enhanced listening experience for the front zone with a reduced contrast for rear sound zones) may be selected via a simple toggle switch or display switch or slider on a GUI that enables the sound system to jump two the distinct modes "Sound Quality" and "Separation". The control may enable the occupant to ability to blend between the contrast mode and the front optimized mode until an acceptable medium is found between such modes.

FIG. 1 depicts a system 100 for providing for sound zone experience optimization control in a vehicle 102 in accordance to one embodiment. The vehicle 100 includes a vehicle audio system 104 arranged to playback audio within the listening environment 106 (or listening room) of the vehicle 102. The vehicle 100 generally includes a first zone seating area 110, a second zone seating area 112, and a third zone seating area 114. It is recognized that the number of zone seating areas positioned in the vehicle 100 may vary based on the desired criteria of a particular implementation.

The first zone seating area 110 may include first and second seats **120*a* and 120*b*, respectively. The first seat 120*a* may correspond to a driver's seat and the second seat 120*b* may correspond to a front passenger's seat. The second zone seating area 112 may include first and second seats 122*a* and 122*b*. The first seat 122*a* may correspond to a left side rear passenger seat and the second seat 122*b* may correspond to a right-side rear passenger seat. Similarly, the third zone seating area 114 may include first and second seats 124*a* and 124*b*. The first seat 124*a* may correspond to a left side rear passenger seat and the second seat 124*b* may correspond to a right-side rear passenger seat. The first and second seats 124*a* and 124*b* of the third zone seating area 112 may form an integrated bench 125 that couples the first and second seats 124*a* and 124*b*** to one another.

The vehicle 100 also includes an instrument panel 130 and an audio controller 132 positioned on the instrument panel 130. Various loudspeakers 134 may be positioned about the vehicle 102 to playback audio processed by the audio controller 132. It is recognized that various headrests 126 as positioned on the seats **120*a*, 120*b*, 122*a*, 122*b* may include loudspeakers 134 that are headrest loudspeakers for playing back audio to a vehicle occupant that is positioned rearward to a corresponding seat 120*a*, 120*b*, 122*a***, and 122*b*. The implementation of the headrest loudspeakers 134 may be optional. It is also recognized that any one or more of the headrests 126 may include sub audio controllers (or sub-media controllers) 136 to process audio data for passengers in any one or more of the seats 122*a*, 122*b*, 124*a*, and 124*b*. The various occupants in the vehicle 100 may pair a corresponding mobile device via a wireless communication protocol (e.g., BLUETOOTH or other suitable protocol) such that the mobile device provides audio data to the audio controller 132 and/or the sub audio controller 136 to play back the audio data via a particular loudspeaker 134 in the vehicle 100.

Generally speaking, occupants positioned in the first zone seating area 110 may playback audio data that is different than the audio played back in one or more of the second zone seating area 112 and the third zone seating area 114. Similarly, occupants sitting in the seats 122*a*, 122*b*, 124*a*, and 124*b* may listen to audio that is different from one another assuming the corresponding seat positioned in front of them includes a corresponding sub audio controller. These aspects generally relate to individual sound zones (ISZ) that are established in the vehicle 102. The audio controller 132 generally controls the playback of the audio such that the audio is processed and transmitted into each of the various zones 110, 112, 114 to provide desired listening experience that is zone specific. The system 100 is generally configured to enable a driver to control the audio controller 132 to enter into a contrast mode (e.g., the system 100 provides an equal listening experience for the first, second, and third zone seating areas 110, 112, and 114 with an intent of achieving maximum contrast for the areas 110, 112, and 114) and a front optimized mode (e.g., the system 100 provides and optimized, spatially enhanced listening experience for the first zone seating area 110 with a reduced contrast for the second and third zone seating areas 112, 114). While the various zones 110, 112, 114 as illustrated in FIG. 1 coincide with vehicle rows that includes at least two seats, it is recognized that such zones 110, 112, 114 may be adapted to coincide to a single seat and is not intended to be limited to a zone having a full row configuration for purposes of applying the aspects related to the contrast mode and the front optimized mode as disclosed herein.

In some instances, any one or more of the sub-audio controllers 136 associated with respective seats 120*a*, 120*b*, 122*a*, 122*b*, 124*a*, 124*b* (or in the second zone seating area 112 and the third zone seating area 114) may interface with the audio controller 132 for providing the contrast mode and the front optimized mode. The audio controller 132 generally includes a user interface 150 (e.g., a human interface machine (HMI)) that enables the driver to select between the contrast mode or the front optimized mode. In general, it is recognized that the audio controller 132 may control a single sub-audio controller 136 positioned in the second zone seating area 112 or in the third zone seating area 114 to enter into the contrast mode or the front optimized mode.

Figure 2:
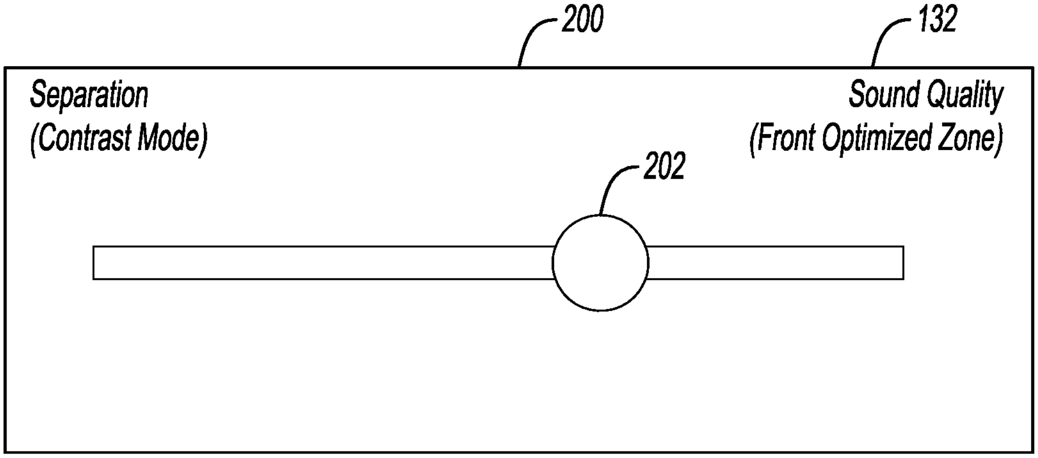
FIG. 2 depicts one example of a graphical user interface (GUI) for providing sound zone experience optimization control in accordance to one embodiment.

FIG. 2 depicts one example of graphical user interface (GUI) 200 on the audio controller 132 for providing sound zone experience optimization control in accordance to one embodiment. In particular, the driver may select between the contrast mode and the front optimized mode via inputs received at the GUI 200 and transmitted to the audio controller 132 to facilitate controlling the audio output in the contrast mode and the front optimized mode. As noted above, the driver may select the contrast mode such that the system 100 provides an equal listening experience for the first, second, and third zone seating areas 110, 112, and 114. In this case, the audio controller 132 may provide for optimal sound isolation between the various seating areas 110, 112 and 114 (e.g., individual sound zones) so that sound from one seating area is isolated from bleeding over into another seating area. However, with the contrast mode, it is possible that the audio performance may not provide as much sound immersion and width and the overall quality of the audio may be diminished. Additionally, the driver may select the front optimized mode such that the system 100 (e.g., via the controller 132) provides an optimized enhanced listening experience for the first zone seating area 110 in which the driver and front passenger is positioned with a reduced contrast (or reduced sound isolation) for the second and third zone seating areas 112, 114. The front optimized mode may be utilized for the driver and/or the front passenger in the area 110 to increase sound immersion and audio width in the use case where a small child is situated in the second zone seating area 112 and such a child may not discern or notice any change in audio with respect a reduced contrast (or reduced sound isolation that may allow more audio from the first zone seating area 110 to bleed over into the second and third zone seating areas 112, 114). This aspect may enable the driver and/or front passenger to obtain an enhanced listening experience. The front optimized mode provides increased audio quality of the driver and/or front passenger by offering improved sound immersion and audio width in stereo while the sound quality may decrease for the audio in the second and/or third zone seating areas 112, 114 given that there may be audio that leaks from the first zone seating areas 110 into the other zone seating areas 112, 114 and the audio being played back in the other zone seating areas 112, 114 may be in mono.

The GUI 200 illustrates a horizontal slider (or switching element 202) that may be utilized to optimize the sound zones for maximum quality or maximum separation between zones. In this case, the switching element illustrates a continuous axis of control and allows for a gradual increase or decrease with respect to sound immersion and width and sound bleed between the different seating areas 110, 112, 114. For example, the user can selectively control the amount of sound immersion and width as desired in the first zone seating area 110 which directly impacts the amount of sound bleed from the first zone seating area 110 into the other seating areas 112 and 114. The user may obtain a maximum level of sound immersion and width by moving the switching element 202 all the way to the right. Similarly, the user can selectively control the amount of sound isolation between the various seating areas 110, 112, and 114 which directly impact the amount of sound immersion and width for the user(s) in the first zone seating area 112. The user may obtain a maximum amount of sound isolation between the various seating areas 110, 112, and 114 which impacts the level of sound immersion and width for the user(s) in the first zone seating area 110. It is recognized that the switching element 202 may include a binary toggle switch, a radio button group, or other suitable variation to select between the modes and to further blend the contrast mode and the front optimized mode.

Figure 3:
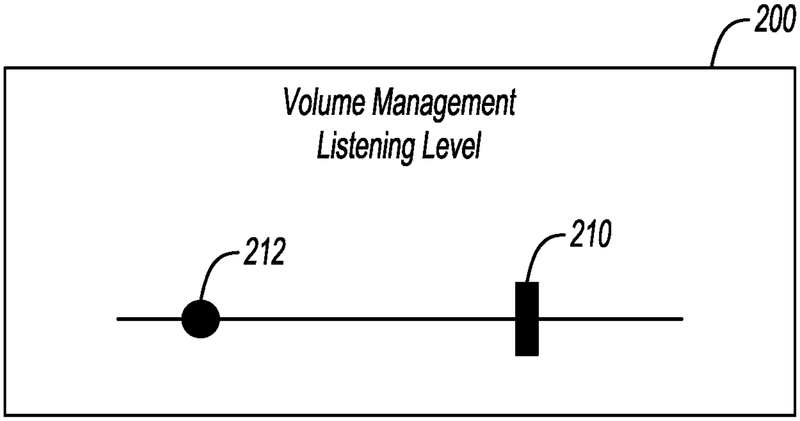
FIG. 3 depicts one example of a volume management control and listening level control positioned on the GUI in accordance to one embodiment.

FIG. 3 depicts one example of a volume management control 210 positioned on the GUI 200 in accordance to one embodiment. The volume management control 210 corresponds to a moveable horizontal switch that may be selected via user interaction of the GUI 200 to transmit signals to the audio controller 132. For example, the user may move the volume management control 210 to selectively increase or decrease the maximum volume level for the second and/or third seating areas 112, 114. The driver or other user positioned in the first zone seating area 110 (e.g., front row)

may elect to reduce (or increase) the volume for an audio source 224 positioned in the second and/or third zone seating area 110, 112 if the driver finds the audio or its volume too loud. This aspect may prevent rear leakage of the audio transmitted in the second and/or third zone seating area 112, 114 from being transmitted to the first zone seating area 110. Indicator 212 generally illustrates the current listening level of the audio in the second and/or third zone seating area 112, 114. The volume management control 210 transmits a signal to the audio controller 132 which limits the volume that originates from the second and/or third zone seating areas 112, 114.

Figure 4:
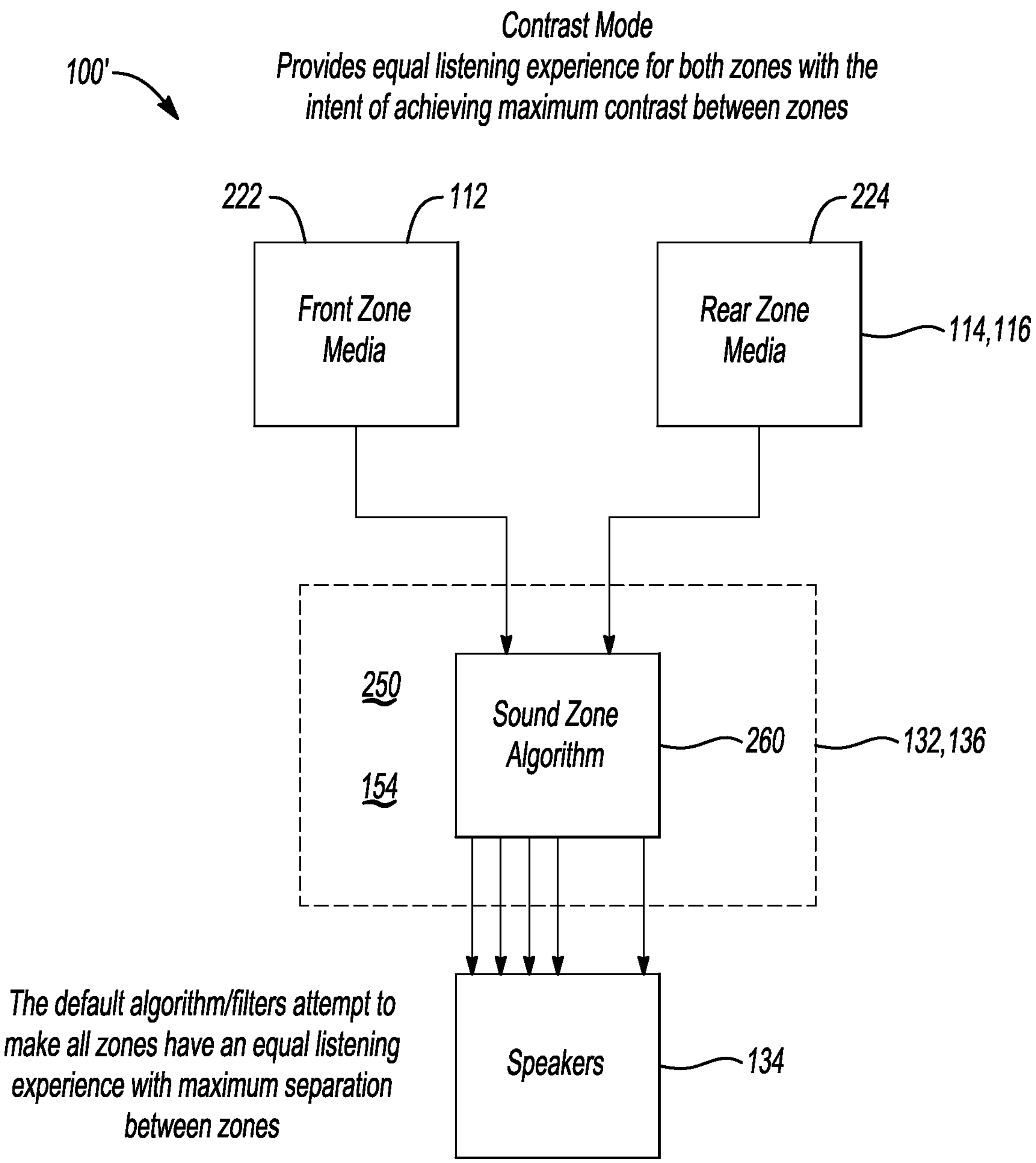
FIG. 4 depicts one aspect of the system of FIG. 1 for providing a contrast mode in the vehicle in accordance to one embodiment.

FIG. 4 depicts a first implementation 100' that employs aspects of FIG. 1 for providing a contrast mode in the vehicle 102 in accordance to one embodiment. One or more audio sources 222 (e.g., mobile devices such as cell phones, laptops, tablets, etc.) as utilized in the first zone seating area 112 provide an audio input signal to the audio controller 132 and/or the sub-audio controller 136 for playback in the vehicle 102 (e.g., in the first zone seating area 110). The audio controller 132 and/or the sub-audio controller 136 includes memory 154. Similarly, one or more audio sources 224 (e.g., mobile devices such as cell phones, laptops, tablets, etc.) as utilized in the second or third zone seating areas 112, 114 provide an audio input signal to the audio controller 132 and/or sub-audio controller 136 for playback in the vehicle 102 (e.g., in the second or third zone seating areas 112, 114). The audio controller 132 and/or the sub-audio controllers 136 each include at least one processor 250 to execute a first sound zone algorithm 260 to provide the contrast mode when selected via the GUI 200.

In the contrast mode, an equal listening experience is generally provided for the first, second, and third zone seating areas 110, 112, 114. The first sound zone algorithm 260, when executed, applies filters to equalize the audio in the various seating zone areas 110, 112, 114. This may involve filtering the audio at frequencies that are not specific to a particular location in the vehicle 102 that would otherwise be applied to isolate the audio between the zone areas 110, 112, 114. One example of the manner in which the filtering of the audio at frequencies that are not specific to a particular location may include minimizing a bandwidth of the media in any of the zone 110, 112, 114 such as filtering very high frequencies or very low frequencies minimize the amount of bleed, or leakage, in adjacent zones. In addition, consider filtering a frequency band above 10 kHz. This condition may reduce some of the sound attributes pertaining to "detail" and "clarity" but may minimize the distraction of those same frequencies that may bleed into adjacent zones. Other examples may include architecture-focused filtering. In this case, if a given speaker architecture cannot adequately produce a given band of frequencies at desired output levels with sufficient sound isolation, these frequency bands can be filtered to provide a greater overall perception of sound isolation.

Figure 5:
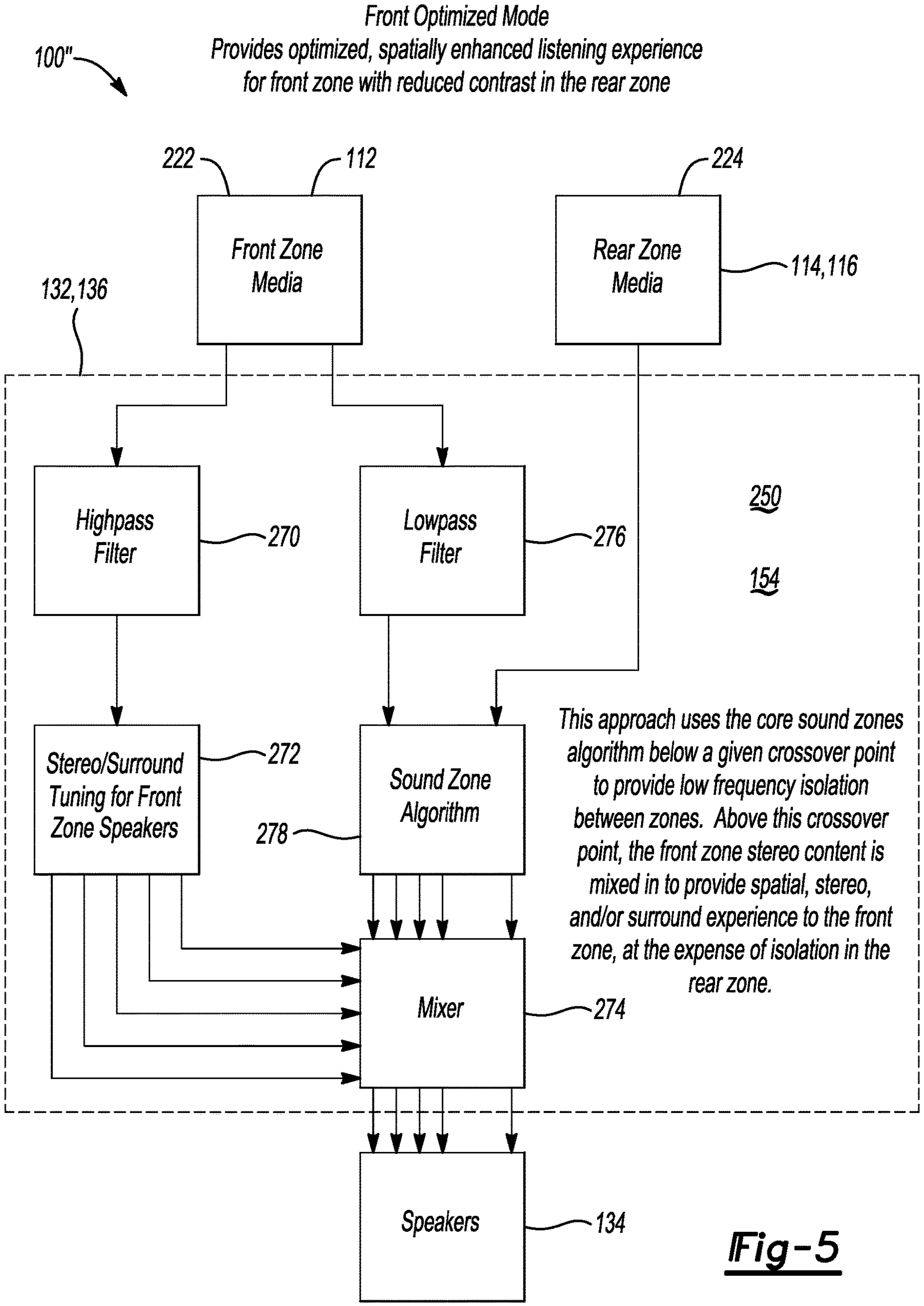
FIG. 5 depicts one aspect of the system of FIG. 1 for providing a front optimized mode in accordance to one embodiment.

FIG. 5 depicts a second implementation 100" that employs aspects of FIG. 1 for providing a front optimized mode in accordance to one embodiment. As noted in connection with FIG. 4, the one or more audio sources 222 (e.g., mobile devices such as cell phones, laptops, tablets, etc.) as utilized in the first zone seating area 112 provide an audio input signal to the audio controller 132 and/or the sub-audio controller 136 for playback in the vehicle 102 (e.g., in the first zone seating area 110). Likewise, the one or more audio sources 224 (e.g., mobile devices such as cell phones, laptops, tablets, etc.) as utilized in the second or third zone seating areas 112, 114 provide an audio input signal to the audio controller 132 and/or sub-audio controller 136 for playback in the vehicle 102 (e.g., in the second or third zone seating areas 112, 114).

In general, the second implementation 100" separates high frequency components and low frequency components of the audio input signal from the one or more audio sources 222 and provides a stereo image for such high frequencies from the audio input signal to provide an enhanced listening experience for the user (e.g., driver, parent, owner of the vehicle, etc.) positioned in the first zone seating area 112. The enhanced listening experience for the user in the front optimized mode provides more sound immersion and width than the mono playback of the audio input received from the one or more audio sources 224 the second or third zone seating areas 112, 114. Similarly, the low frequency audio input from the one or more audio sources 222 in first zone seating area 112 may be mixed with the audio input from the one or more audio sources 224 in the second and/or third zone seating area 112, 114 which may reduce the amount of audio isolation (or reduce the audio contrast) between the audio being played back from the first zone seating area 112 and that of the second and/or third zone seating areas 112, 114. In this instance, the audio playback in the second or third zone seating areas 112, 114 may not be as optimum of that provided in the first zone seating area 112.

For example, the audio controller 132 and/or the sub-audio controllers 136 include a first filter 270, a tuning circuit 272, a mixer 274, a second filter 276, and a second sound zone algorithm 278. In one example, the first filter 270 may be a high pass filter and the second filter 276 may be a low pass filter. As noted above, in the front optimized mode, the system 100 provides for an optimized, spatially enhanced listening experience for the first seating zone area 110 with reduced contrast in the second and/or third seating zone areas 112, 114. In other words, the second implementation 100" provides reduced sound isolation between the audio being played back in the first seating zone area 110 and that of the second and/or third seating zone areas 112, 114 as the audio playback in the first seating zone area 110 may provide for a surround sound immersion and width (e.g., improved listening experience) than that of the mono sound played back in the second and/or third seating zone areas 112, 114. The audio being played back in the first seating zone area 110 may have some contrast (or isolation) with respect to the audio being played back in the second or third seating zone area 112, 114. However, the user(s) in the second and/or third seating zone areas 112, 114 may not have as much sound isolation with respect to the audio being played back in zones 112, 114 and the audio being played back in the zone 110. The objective may be to provide enhanced audio playback characteristics for the user positioned in the first seating zone area 110 while reducing the audio playback characteristics for the user(s) positioned on the second seating zone areas 112, 114.

The audio controller 132 and/or the sub-audio controllers 136 separate the high frequencies and low frequencies from the audio input from the one or more audio sources 222 in the first zone seating area 112 via the first filter 270 and the second filter 276. For example, the first filter 270 allows frequencies from the audio input that are above a first crossover frequency to pass therethrough and the second filter 276 allows frequencies from the audio input that are below a second crossover frequency to pass therethrough. In one example, the same frequency value may be used for the first and the second crossover frequencies. In yet another example, different frequency values may be used for the first crossover frequency and the second crossover frequency.

The tuning circuit 272 receives the audio signal including the frequencies that are greater than the first crossover frequency and provides a stereo (or surround) based audio output for such frequencies. This aspect increases the audio performance (or sound quality) for the user positioned in the first zone seating area 110 (e.g., driver in the driver side seat). As noted above, this provides a spatial and/or surround experience (or surround sound immersion and width) in the first zone seating area 112. The processor 250 executes the second sound zone algorithm 278 to provide a mono based audio output with the frequencies that are below the second crossover frequency of the audio input provided by the audio source(s) 222 in the first zone seating area 110, and the audio input provided by the audio sources 224 in the second and/or third zone seating area 112, 114. In this case, the low frequencies are mixed down to mono since this condition has only a slightly negative effect on the sound experience and also promotes the ability to cancel sounds between the zones 110, 112, and 114. The mixer 274 mixes the surround audio output from the tuning circuit 272 and the mono audio output derived from executing the second sound zone algorithm 278.

The mixer 274 mixes the stereo based audio output as provided from the tuning circuit 272 and the low frequency audio output as provided by the second filter 276 and provides the stereo based audio output and the low frequency audio output to loudspeakers 134 as a first final audio output in the first zone seating area 110 for the user (e.g., driver) that is positioned in this area 110. Additionally, the mixer 274 mixes the low frequency audio out as provided by the second filter 276 and audio output as provided by the audio sources 224 in the second and/or third zone seating area 112, 114 as a second final audio output (i.e., mono based audio output) to the loudspeakers 134 positioned in the second and/or third seating area 112, 114.

The low frequency signals are provided to the sound zone algorithm 278 (and processed by the controller 132) to actively cancel the audio signals (e.g., play back the signals with a flipped or inverted phase) in the rear zone (or third zone seating area 114). Therefore, occupants in the third zone seating area 114 (or rear zone occupants) are hearing their selected media and the addition of cancellation signals (or mixed cancellation signals) for the front zone (or first zone seating area 110) low frequency signals. For the first zone seating area 110 (or front zone), a similar situation exits, however, with an alternate media mapping (e.g., audio signal from the front zone (or first zone seating area 110)) that is mixed with cancelled audio signals from the rear zone media cancellation signals (or audio signals from the second and or third zone seating areas 112, 114). In the front optimized mode, the high frequency stereo/surround content for first zone seating area 110 provides occupants therein a better spatial (and overall) audio experience (e.g., improvement in sound quality) by providing the known detriment of creating more bleed/distraction for the occupants in the second and/or third zone seating areas 112, 114.

Figure 6:
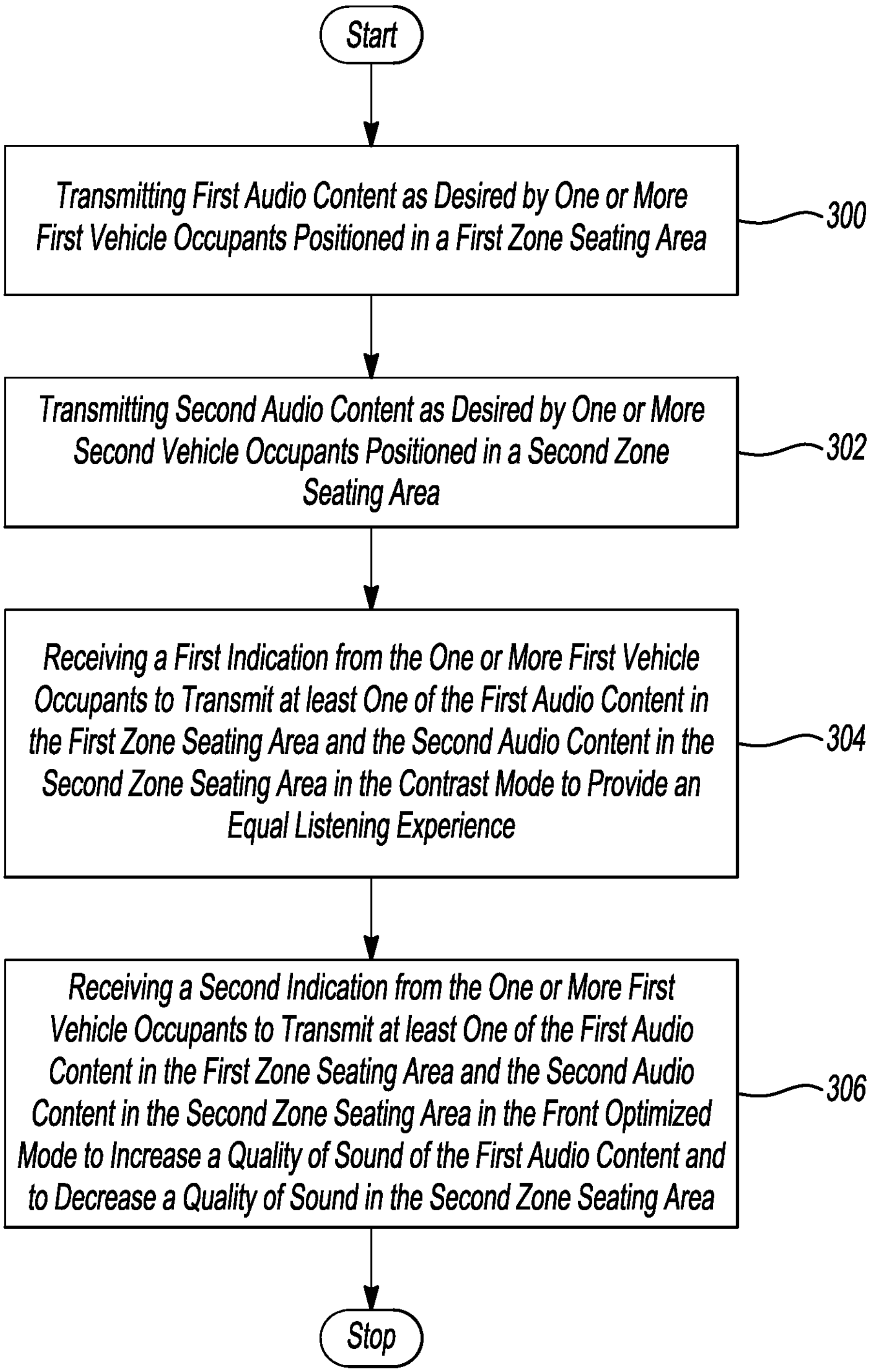
FIG. 6 depicts a method for providing a contrast mode and a front optimized mode for the playback of audio in a vehicle in accordance to one embodiment.

FIG. 6 depicts a method 300 for providing a contrast mode and a front optimized mode for the playback of audio in a vehicle in accordance to one embodiment.

In operation 302, the audio controller 132 transmits first audio content as desired by one or more first vehicle occupants positioned in a first zone seating area 110. In operation 304, the audio controller 132 transmits second audio content as desired by one or more second vehicle occupants positioned in a second zone seating area 112 (or the third zone seating area 114).

In operation 306, the audio controller 132 receives a first indication (e.g., via the GUI 200 or other user interface) from the one or more first vehicle occupants to transmit at least one of the first audio content in the first zone seating area 110 and the second audio content in the second zone seating area 112 in the contrast mode. In the contrast mode, the audio controller 132 provides an equal listening experience for the audio that is played back in the first zone seating area 110 and in the second zone seating area 112 while achieving isolation between the first audio content being played back in the first zone seating area 110 and the second audio content being played back in the second zone seating area 112 (or third zone seating area 114). In this instance, the audio controller 132 achieves an adequate level of sound isolation between the sound played back in the first zone seating area 110 and the sound played back in the second zone seating area 112 (i.e., sound from the first zone seating area 110 may not be heard by users in the second zone seating area 112 and vice versa) (see FIG. 4). With this condition, the sound that is played back in the first zone seating area 110 for the first vehicle occupants seated therein may be adequate however the sound may not be played back for such users at a premium level.

In operation 308, the audio controller 132 receives a second indication (e.g., via the GUI 200 or other user interface) from the one or more first vehicle occupants to transmit at least one of the first audio content in the first zone seating area 110 and the second audio content in the second zone seating area 112 in the front optimized mode. In the front optimized mode, the audio controller 132 increases the quality of sound of the first audio content being played back in the first zone seating area 110 and decreases the quality of sound (or the amount of overall sound isolation) in the second zone seating area 112 (e.g., see FIG. 5). For example, the audio controller 132 provides additional sound immersion and gap for the audio being played back in the first zone seating area 110 which leads to an improvement in the sound quality. Another mechanism that may increase the sound quality involves the play back of additional surround content to the loudspeakers 134 positioned in the first zone seating area 110 (or front row) or to or headrest speakers. While this creates additional width for the soundstage and improved immersive sound experience (e.g., increase the sound quality in the first zone seating area 110), it also causes additional bleed or leakage to the rear zone occupants, therefore causing a decreased overall experience in the second and/or third zone seating area 112, 114. Due to the increased level of and the quality of sound in the first zone seating area 110, this may attribute to or lead to less sound isolation between the first zone seating area 110 and the second and/or third zone seating areas 112, 114 which may decrease the sound quality of the audio being played back in the second and/or third zone seating areas 112, 114. However, in this instance, the passenger located in the second and/or third zone seating areas 112, 114 may be a child, etc. where the overall decrease of the quality of the sound may not be noticed or discerned.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for playing back audio in a vehicle, the apparatus comprising:

memory; and an audio controller including the memory and programmed to:

transmit first audio content to one or more first vehicle occupants positioned in a first zone seating area;

transmit second audio content to one or more second vehicle occupants positioned in a second zone seating area;

receive a first command to transmit at least one of the first audio content in the first zone seating area and the second audio content in the second zone seating area to provide an equal listening experience for the first zone seating area and the second zone seating area; and receive a second command from the one or more first vehicle occupants to transmit at least one of the first audio content in the first zone seating area and the second audio content in the second zone seating area to increase a quality of sound of the first audio content being played back in the first zone seating area and to decrease a quality of sound in the second zone seating area, wherein the audio controller is further programmed to mix one or more first frequencies on a first audio input signal with a second audio input signal to provide the second audio content in the second zone seating area which decreases the quality of the second audio content.

2. The apparatus of claim 1, wherein the audio controller is further programmed to provide isolation between the first audio content being played back in the first zone seating area and the second audio content being played back in the second zone seating area based on the first command.

3. The apparatus of claim 1, wherein the audio controller includes a first filter that is programmed to enable one or more first frequencies on a first audio input signal to pass therethrough.

4. The apparatus of claim 3, wherein the audio controller is further programmed to provide at least a portion of the first audio content as at least a stereo audio content to be played back in the first zone seating area, and wherein the stereo audio content includes the one or more first frequencies on the first audio input signal.

5. The apparatus of claim 3, wherein the audio controller includes a second filter that is programmed to enable one or more of second frequencies on the first audio input signal to pass therethrough.

6. The apparatus of claim 5, wherein the one or more first frequencies are different than the one or more second frequencies.

7. The apparatus of claim 5, wherein the audio controller is further programmed to mix the one or more first frequencies with the one or more second frequencies and to provide the first audio content with the mixed one or more first frequencies and the one or more second frequencies in the first zone seating area.

8. The apparatus of claim 1, wherein the audio controller is further programmed to receive the first audio content or the second audio content from a mobile device.

9. A non-transitory computer readable medium storing a computer-program product embodied in a non-transitory computer readable medium that is programmed to play audio in a vehicle, the computer-program product comprising instructions to:

transmit first audio content to one or more first vehicle occupants positioned in a first zone seating area;

transmit second audio content to one or more second vehicle occupants positioned in a second zone seating area;

receive a first command to transmit at least one of the first audio content in the first zone seating area and the second audio content in the second zone seating area to provide an equal listening experience for the first zone seating area and the second zone seating area; and receive a second command from the one or more first vehicle occupants to transmit at least one of the first audio content in the first zone seating area and the second audio content in the second zone seating area in to increase a quality of sound of the first audio content being played back in the first zone seating area and to decrease a quality of sound in the second zone seating area; and mix one or more first frequencies on a first audio input signal with a second audio input signal to provide the second audio content in the second zone seating area which decreases the quality of the second audio content.

10. The non-transitory computer readable medium of claim 9 further comprising instructions to provide isolation between the first audio content being played back in the first zone seating area and the second audio content being played back in the second zone seating area based on the first command.

11. The non-transitory computer readable medium of claim 9 further comprising instructions to enable one or more first frequencies on a first audio input signal to pass therethrough.

12. The non-transitory computer readable medium of claim 11 further comprising instructions to provide at least a portion of the first audio content as at least a stereo audio content to be played back in the first zone seating area, and wherein the stereo audio content includes the one or more first frequencies on the first audio input signal.

13. The non-transitory computer readable medium of claim 11 further comprising instructions to enable one or more of second frequencies on the first audio input signal to pass therethrough.

14. The non-transitory computer readable medium of claim 13, wherein the one or more first frequencies are different than the one or more second frequencies.

15. The non-transitory computer readable medium of claim 13 further comprising instructions to mix the one or more first frequencies with the one or more second frequencies and to provide the first audio content with the mixed one or more first frequencies and the one or more second frequencies in the first zone seating area.

16. The non-transitory computer readable medium of claim 9 further comprising instructions to receive the first audio content or the second audio content from a mobile device.

17. A method for playing audio in a vehicle, the method comprising:

transmitting first audio content to one or more first vehicle occupants positioned in a first zone seating area;

transmitting second audio content to one or more second vehicle occupants positioned in a second zone seating area;

receiving a first command to transmit at least one of the first audio content in the first zone seating area and the second audio content in the second zone seating area to provide an equal listening experience for the first zone seating area and the second zone seating area; and receiving a second command from the one or more first vehicle occupants to transmit at least one of the first audio content in the first zone seating area and the second audio content in the second zone seating area to increase a quality of sound of the first audio content being played back in the first zone seating area and to decrease a quality of sound in the second zone seating area;

mixing one or more first frequencies on a first audio input signal with a second audio input signal to provide the second audio content in the second zone seating area which decreases the quality of the second audio content.

18. The method of claim 17 further comprising providing isolation between the first audio content being played back in the first zone seating area and the second audio content being played back in the second zone seating area based on the first command.

* * * * *